US012075342B2

United States Patent
Saini et al.

(10) Patent No.: US 12,075,342 B2
(45) Date of Patent: Aug. 27, 2024

(54) CELLULAR NETWORK ONBOARDING THROUGH WIRELESS LOCAL AREA NETWORK

(71) Applicant: Cisco Technology, Inc., San Jose, CA (US)

(72) Inventors: Vinay Saini, Bangalore (IN); Robert Edgar Barton, Richmond (CA); Elango Ganesan, Palo Alto, CA (US); Swapna Anandan, Fremont, CA (US); Jerome Henry, Pittsboro, NC (US)

(73) Assignee: Cisco Technology, Inc.

( * ) Notice: Subject to any disclaimer, the term of this patent is extended or adjusted under 35 U.S.C. 154(b) by 0 days.

(21) Appl. No.: 18/057,810

(22) Filed: Nov. 22, 2022

(65) Prior Publication Data

US 2023/0081990 A1 Mar. 16, 2023

Related U.S. Application Data

(62) Division of application No. 17/136,773, filed on Dec. 29, 2020, now Pat. No. 11,523,332.

(51) Int. Cl.
*H04W 48/16* (2009.01)
*H04W 8/18* (2009.01)
(Continued)

(52) U.S. Cl.
CPC .......... *H04W 48/16* (2013.01); *H04W 8/183* (2013.01); *H04W 12/06* (2013.01); *H04W 36/14* (2013.01); *H04W 48/18* (2013.01); *H04W 84/12* (2013.01)

(58) Field of Classification Search
CPC ..................................... H04W 88/06
(Continued)

(56) References Cited

U.S. PATENT DOCUMENTS

| 2005/0037757 | A1* | 2/2005 | Moon | ............... H04W 36/0072 |
| | | | | 455/436 |
| 2008/0039132 | A1* | 2/2008 | Delibie | ................. H04W 88/06 |
| | | | | 455/552.1 |

(Continued)

OTHER PUBLICATIONS

The What and How of Remote SIM Provisioning, GSMA, eSIM Whitepaper, Mar. 2018, 21 pages.
(Continued)

*Primary Examiner* — Kiet M Doan
(74) *Attorney, Agent, or Firm* — Merchant & Gould P.C.

(57) ABSTRACT

Automatic onboarding of a device onto a cellular network may be provided through a Wireless Local Area Network (WLAN). Subsequent to a device connecting to a first network (e.g., the WLAN), information associated with the device and the first network may be received. One or more tags may be generated and an intent profile may be defined for the device based on the received information, where the intent profile may indicate at least a second network (e.g., the cellular network) that the device is enabled to connect with and one or more policies associated with the connection. The tags and intent profile may be transmitted to a service provider platform, and an onboarding profile template identified using the tags and the intent profile may be received from the service provider platform. The onboarding profile template may be provided to the device to enable connection to the second network.

20 Claims, 6 Drawing Sheets

(51) Int. Cl.
   *H04W 12/06*   (2021.01)
   *H04W 36/14*   (2009.01)
   *H04W 48/18*   (2009.01)
   *H04W 84/12*   (2009.01)

(58) Field of Classification Search
   USPC .............................. 370/338, 352; 379/88.17
   See application file for complete search history.

(56) References Cited

U.S. PATENT DOCUMENTS

| | | | |
|---|---|---|---|
| 2008/0218310 | A1 | 9/2008 | Alten et al. |
| 2010/0281525 | A1* | 11/2010 | Nakajima ............. H04W 48/14 |
| | | | 370/254 |
| 2013/0078947 | A1* | 3/2013 | Pecen ................. H04L 63/1458 |
| | | | 455/411 |
| 2015/0113620 | A1* | 4/2015 | Brewer ............... H04L 63/0853 |
| | | | 726/7 |
| 2016/0261596 | A1 | 9/2016 | Khello et al. |
| 2017/0048702 | A1* | 2/2017 | Barrett .................. H04W 76/18 |
| 2017/0223535 | A1* | 8/2017 | Schell ................... H04W 36/14 |
| 2017/0230905 | A1 | 8/2017 | Pularikkal et al. |
| 2018/0376384 | A1* | 12/2018 | Youn ................. H04W 36/0022 |
| 2019/0230510 | A1 | 7/2019 | Ben Henda et al. |
| 2019/0238539 | A1 | 8/2019 | Arora et al. |
| 2020/0186992 | A1 | 6/2020 | Bas Sanchez et al. |
| 2020/0329338 | A1 | 10/2020 | Lovlekar et al. |
| 2022/0210722 | A1* | 6/2022 | Saini .................... H04W 36/14 |

OTHER PUBLICATIONS

The 5G Guide A Reference For Operators, GSMA, Apr. 2019, 288 pages.

* cited by examiner

US 12,075,342 B2

CELLULAR NETWORK ONBOARDING THROUGH WIRELESS LOCAL AREA NETWORK

CROSS-REFERENCE TO RELATED APPLICATION

This application is a division of U.S. patent application Ser. No. 17/136,773, filed Dec. 29, 2020, titled "Cellular Network Onboarding Through Wireless Local Area Network", the disclosure of which is incorporated herein by reference in its entirety.

TECHNICAL FIELD

The present disclosure relates generally to automatically onboarding devices onto a cellular network leveraging Wireless Local Area Network (WLAN) onboarding capabilities.

BACKGROUND

For a device to gain access to a wireless network, also referred to as onboarding, a device may be authenticated via one or more authentication mechanisms specific to the wireless network and granted or denied access accordingly. Some operating environments may deploy more than one wireless network, where each wireless network may include different authentication mechanisms of varying levels of complexity. Therefore, to onboard onto each wireless network that the device is capable of accessing, the device must be authenticated via separate authentication mechanisms for the respective networks.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
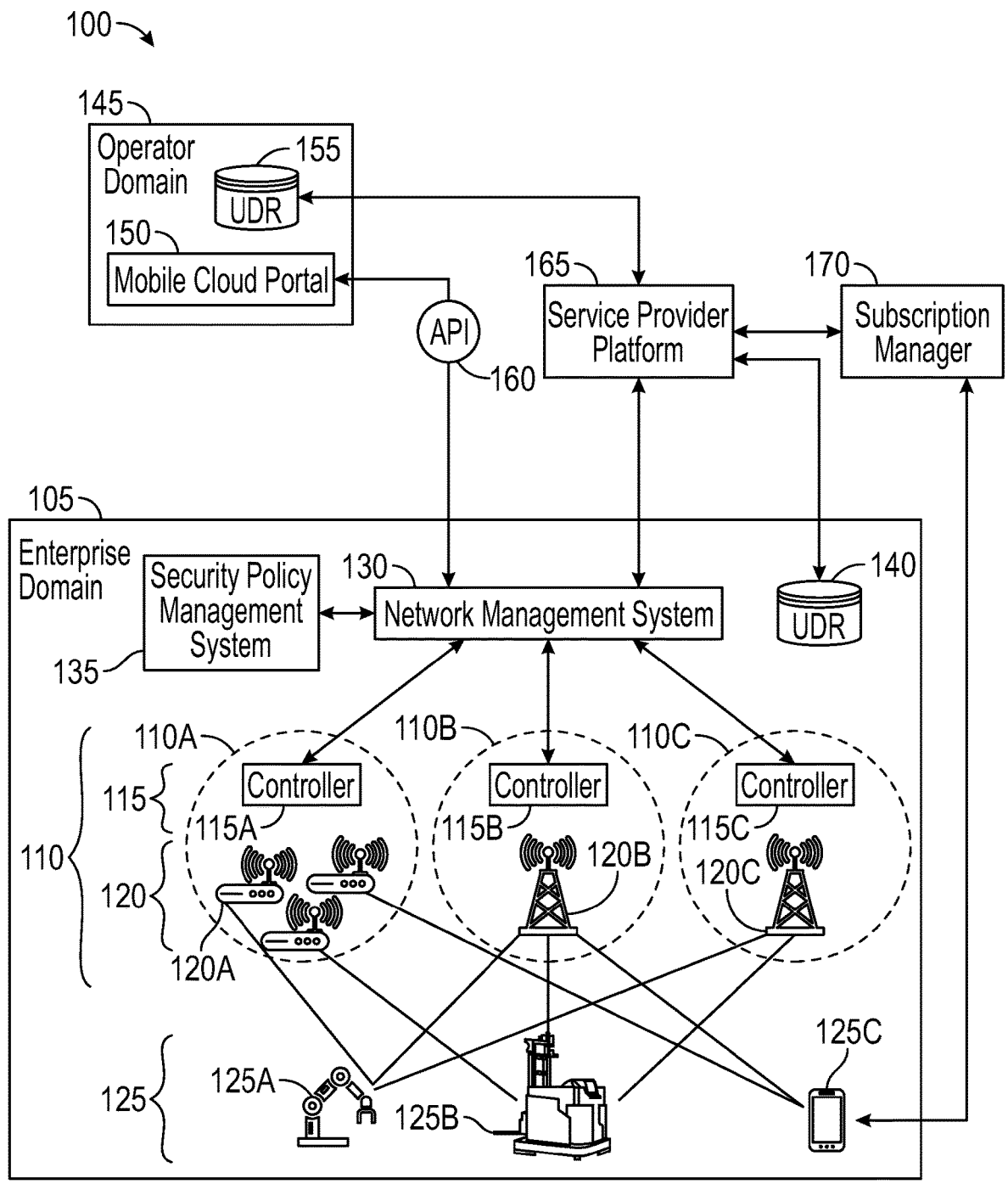
FIG. 1 is a block diagram of operating environment.

Automatic onboarding of a device onto a cellular network may be provided through a Wireless Local Area Network (WLAN). Subsequent to a device connecting to a first network (e.g., the WLAN), information associated with the device and the first network may be received. One or more tags may be generated and an intent profile may be defined for the device based on the received information, where the intent profile may indicate at least a second network (e.g., the cellular network) that the device is enabled to connect with and one or more policies associated with the connection. The tags and intent profile may be transmitted to a service provider platform, and an onboarding profile template identified using the tags and the intent profile may be received from the service provider platform. The onboarding profile template may be provided to the device to enable connection to the second network.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A new generation of private Fifth Generation (5G) networks are emerging to address critical wireless communication requirements in enterprise, infrastructure, and industry. The private 5G networks are physical or virtual cellular systems that may be deployed for private use by different organizations. In other words, these private 5G networks may be Non-public Networks (NPNs). The private 5G networks may have a variety of radio types and will operate in conjunction with wireless networks, including Wireless Local Area Networks (WLANs) that are also known as and referred to herein as Wireless Fidelity (Wi-Fi) networks. Specifically, the private 5G networks are expected to operate in conjunction with Wi-Fi 6 and Wi-Fi 7 networks.

As one example, mining facilitates, large factories and industrial yards may be typical verticals where this type of dual deployment of a private 5G network and Wi-Fi network is expected. In these specialized fields, many different devices will support both Wi-Fi and 5G, including robots and specialized vehicles, as well as a multitude of handheld devices, such as mineral assay X-ray Fluorescence Spectroscopy (XFR) sample analyzers to portable air quality sensors, structure hardness testers, Peer-to-Peer (2P) communication devices, thermal imagers and more.

However, currently, there are two separate authentication mechanisms by which these devices may be onboarded to the Wi-Fi and 5G networks. A first authentication mechanism for onboarding to Wi-Fi networks may include an Institute of Electrical and Electronics Engineers (IEEE) 802.1X based authentication utilizing a local Authentication, Authorization, and Accounting (AAA) server that determines validity of provided access credentials and accordingly grants or denies a device access to the Wi-Fi network. The credentials may include a username and password, a digital certificate, or a digital key, among other example credentials. On the other hand, a second authentication mechanism for onboarding to 5G networks, which is significantly more complex than the first authentication mechanism, utilizes Subscriber Identity Module (SIM)-based authentication, which requires additional infrastructure components such as a Home Location Register (HLR)/ Home Subscriber Server (HSS), and a Policy and Charging Rules Function (PCRF), among other components.

In some of these enterprise environments, it may be critical for a user to be able to grab a spare device when needed and have it be quickly operational without the need to perform the complex on-boarding procedures currently required to gain access to a private 5G network. Therefore, there is a need for a common authentication mechanism that allows onboarding of the devices via either the private 5G network or the Wi-Fi network in a simple and secure manner.

Embodiments described herein achieve this common authentication mechanism by leveraging the simpler authentication mechanism for onboarding a device to a Wi-Fi network, and subsequently connecting the device to a private cellular network, such as an enterprise managed private 5G or private Long-Term Evolution (LTE) network.

In one embodiment, the device may be onboarded to a private cellular network through the Wi-Fi network using a defined intent profile for the device. For example, a network management system may generate tags and define an intent profile for the device based on identifying information about the device, such as an Identifier (ID) of a Subscriber Identity Module (SIM) or Embedded-SIM (eSIM) of the device, and contextual information related to the device within the Wi-Fi network that is gleaned from the Wi-Fi network during device authentication for onboarding to the Wi-Fi network. The tags and intent profile may be transmitted to and utilized by a service provider platform that, among other services, provides provisioning services to identify an onboarding profile template for provisioning the SIM or eSIM on the device so that the device can access services accordingly. The onboarding profile template may indicate which network(s) and particular network slices of each network the device can connect to. Because the onboarding profile template is influenced by the tags and intent profile, access provided to the device may be customized according to enterprise intent. The onboarding profile template may be provided to the device to enable the device to connect to the private cellular network.

In another embodiment, authentication of the device to the Wi-Fi network provides the device access to the private cellular network (e.g., a form of zero-trust). For example, the device may authenticate on the Wi-Fi network and attempt to connect to the private cellular network. The private cellular network recognizes that this device is unknown to the private cellular network (e.g., lacks valid credentials to connect). However, based on trust established between the private cellular network and the Wi-Fi network, a determination whether this device is authenticated on the Wi-Fi network is made. This determination may be performed by sending an authentication challenge over the Wi-Fi network to confirm that the device is authenticated on the Wi-Fi network, where a response to the authentication challenge is received over the private cellular network and verified with the Wi-Fi network to confirm. If determined to be authenticated, an identifier, such as a token, may be generated to grant access to the private cellular network to the device. The token may be tied to policies, including which network slices of the private cellular network the device has access to and when the token is available or the token is valid to access the private cellular network. The token may be provided to the device such that the device may use the token to gain access to the private cellular network.

In some examples, the other embodiment may be performed under circumstances where connectivity disruptions prevent the network management system from communicating with the service provider platform. In other examples, the other embodiment may be performed for devices that do not have a SIM or e-SIM that can be provisioned or for enterprise domains that do not provide SIM management due to the overhead.

FIG. 1 shows a block diagram of operating environment 100. As shown in FIG. 1, operating environment 100 may comprise an enterprise domain 105. Enterprise domain 105 may be associated with one or more sites of an organization. As one example, a site may be an industrial manufacturing plant associated with an industrial enterprise. Enterprise domain 105 may deploy multiple wireless networks, including a Wi-Fi network 110A, a private 5G network 110B, and a private Long-Term Evolution (LTE) network 110C, collectively referred to as networks 110. Networks 110 are illustrated separately (e.g., are shown as non-overlapping) for clarity; however, one or more networks 110 deployed in enterprise domain 105 may have overlapping coverage areas. Each of networks 110 may generally be comprised of controllers 115 and access points 120 that enable a plurality of devices 125 within enterprise domain 105 to connect to networks 110, however the particular network infrastructure may vary based on network type.

As one example, Wi-Fi network 110A may be a WLAN following IEEE 802.11 standards that is enterprise managed. Infrastructure of Wi-Fi network 110A may include a WLAN controller 115A and a plurality of Wi-Fi APs 120A. Wi-Fi APs 120A may be networking hardware devices that enable devices 125 to connect to Wi-Fi network 110A. WLAN Controller 115A may manage and configure Wi-Fi APs 120A of Wi-Fi network 110A.

In contrast, private 5G network 110B and private LTE network 110C may be private cellular networks that are enterprise managed. Infrastructure of private LTE network 110C may include a controller 115C comprising a core network, such as an Evolved Packet Core (EPC), and networking hardware devices, such as eNodeBs (eNBs), serving as APs 120C that enables devices 125 to connect to private LTE network 110C. Infrastructure of the private 5G network 110B may include a non-standalone (NSA) infrastructure or a standalone infrastructure. The NSA infrastructure may include a 5G Radio Access Network (RAN) and a 5G New Radio (NR) interface working in conjunction with an LTE infrastructure, such as the infrastructure for private LTE network 110C discussed immediately above. The standalone infrastructure includes the 5G RAN that includes the NR, a controller 115B comprising a cloud-native 5G core network that connects to the NR, and networking hardware devices, such as gNodeBs (gNBs), serving as APs 120B that enable other devices, such as devices 125, to connect to private 5G network 110B.

The example wireless networks described above are non-limiting and non-exclusive examples of networks 110 deployed by enterprise domain 105. In other embodiments, more or fewer networks 110 may be deployed and networks 110 may include various combinations of network types.

Devices 125 may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network. Moreover, types of devices 125 within enterprise domain 105 may be dependent on a type of site or organization associated with the enterprise. Continuing the above example, where the site may be an industrial manufacturing plant, devices 125 may include device 125A that is a robotic arm, device 125B that is an Automatic Guided Vehicle (AGV), and device 150 that is a smartphone, as illustrated in FIG. 1.

Devices 125 may have an embedded Wi-Fi radio that enables devices 125 to interface with (e.g., connect to) Wi-Fi networks, such as Wi-Fi network 110A. In some examples, devices 125 may also have a removable SIM or an eSIM that are provisioned to enable device 125 to interface with (e.g., connect) to private cellular networks, such as private 5G network 110B and private LTE network 110C. A removable SIM may be a SIM card, for example, that a user receives and inserts into a device upon establishing a contract with a Mobile Network Operator (MNO) for cellular services. The SIM card stores subscriber data, including subscription credentials issued and authenticated by the MNO. An eSIM is a SIM securely downloaded within a secure element (e.g., an Embedded Universal Integrated Circuit Card (eUICC)) that can be permanently embedded in a device. The eSIM may accommodate a plurality of SIM profiles, where each profile includes MNO and subscriber data.

Enterprise domain 105 may also include a network management system 130 and a security policy management system 135. Network management system 130 manages networks 110 deployed by enterprise domain 105 and facilitates authentication of devices 125 to networks 110 for onboarding. Additionally, network management system 130 is communicatively coupled with one or more external systems, described in more detail below, to further facilitate the onboarding process. One non-limiting example of network management system 130 is the Cisco® Digital Network Architecture Center (DNA-C). Security policy management system 135 may provide policy provisioning and enforcement for devices 125 connected to networks 110 to enhance security of networks 110. In some examples, security policy management system may be a sub-system of network management system 130. One non-limiting example of security policy management system 135 is the Cisco® Identity Services Engine (ISE).

Enterprise domain 105 may further include a local User Data Repository (UDR) 140. Local UDR 140 may include data associated with users and devices 125 of enterprise domain 105 that is maintained by the enterprise or a third party on behalf of the enterprise. The data may indicate what a SIM of each of devices 125 is subscribed to (e.g., which networks 110 the devices 125 can access). The data may be in a form of a profile that not only indicates which networks 110 the devices 125 can access but which particular network slices of networks 110 devices 125 can access. In some examples, local UDR 140 may be specific to one of networks 110 managed by the enterprise, and thus enterprise domain may include multiple local UDRS, one for each of networks 110 managed by the enterprise. In further examples, local UDR 140 may be a database associated with network management system 130. Data from local UDR 140 may be looked up (e.g., queried) or otherwise obtained by external systems, such as a service provider platform 165 discussed in detailed below, for use in SIM or eSIM provisioning for devices 125.

Operating environment 100 may further include an operator domain 145 that includes a mobile cloud portal 150 and an operator UDR 155, among other components. Operator domain 145 may be associated with an MNO that is providing cellular services for the enterprise domain. For example, the MNO may be providing services to support private 5G network 110B and private LTE network 110C deployed in enterprise domain 105. Mobile cloud portal 150 may extend enterprise domain 105 to include a slice of MNO networks. For example, using mobile cloud portal 150, enterprise administrators can view an entirety of networks (e.g., private 5G network 110B and private LTE network 110C) as if entirely owned and operated by enterprise. One non-limiting example of mobile cloud portal 150 is the Cisco® Unified Domain Center (UDC). Mobile cloud portal 150 may be accessed via network management system 130 over an application programming interface (API) 160.

In addition to the enterprise, the MNO may provide a plurality of services (e.g., public and private cellular services) to a plurality of other subscribers. Operator UDR 155 may be a subscriber database of the MNO that includes data associated with each of the plurality of subscribers, including the enterprise, and indicating what a particular SIM is subscribed to (e.g., which of MNO networks a device associated with the SIM can access). Similar to local UDR 140, the data may be in form of a profile that not only indicates which of the MNO networks can be accessed but which particular network slices of networks can be accessed. Each MNO may have a similar UDR to operator UDR 155. Data from operator UDR 155 or other MNO UDRs may be looked up (e.g., queried) or otherwise obtained by external systems, such as a service provider platform 165 discussed in detailed below, for use in SIM or eSIM provisioning for devices 125.

Operating environment 100 may further include service provider platform 165 and a subscription manager 170. Service provider platform 165 may provide, among other services, SIM or eSIM provisioning services to enable devices 125 to connect to private cellular networks such as private 5G network 110B and private LTE network 110C. In some examples, service provider platform 165 may be an IoT connectivity management platform, such as the Cisco® IoT Control Center. Service provider platform 165 may be communicatively coupled to network management system 130, where service provider platform 165 receives information associated with devices 125 from network management system 130 to facilitate provisioning and provides necessary onboarding profile templates to network management system 130 for pushing to devices 125 to enable connectivity to the private cellular networks.

Subscription Manager 170, implemented as part of 3rd Generation Partnership Project (3GPP) protocols, has at least two components including a Subscription Manager Data Preparation (SM-DP) component and a Subscription Manager Secure Routing (SM-SR) component. In some examples, functions of these at least two components may be enhanced and combined into a single component, also referred to herein as an SM-DP+. An address associated with Subscription Manager 170 may be included in the onboarding profile templates provided to devices 125, and utilized by devices 125 to communicate with Subscription Manager 170 to request download of a profile for the SIM or eSIM of devices 125 to enable devices 125 to connect to a private cellular network. In some examples, subscription Manager 170 may be communicatively coupled to service provider platform 165 to enable verification of devices 125 with service provider platform 165 upon receiving a request from devices 125 to download the profile.

In one embodiment, as described with detail with respect to FIG. 2 and FIG. 3 below, devices 125 may be onboarded to one or more of private 5G network 110B and private LTE network 110C through Wi-Fi network 110A using an intent profile defined by network management system 130. In another embodiment, as described with detail with respect to FIG. 4 and FIG. 5 below, authentication of devices 125 to Wi-Fi network 110A is leveraged as a form of zero-trust to provide devices 125 access to one or more of private 5G network 110B and private LTE network 110C.

The elements described above of operating environment 100 (e.g., controllers 115, APs 120, network management system 130, security policy management system 135, mobile cloud portal 150, service provider platform 165, subscription manager 170) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
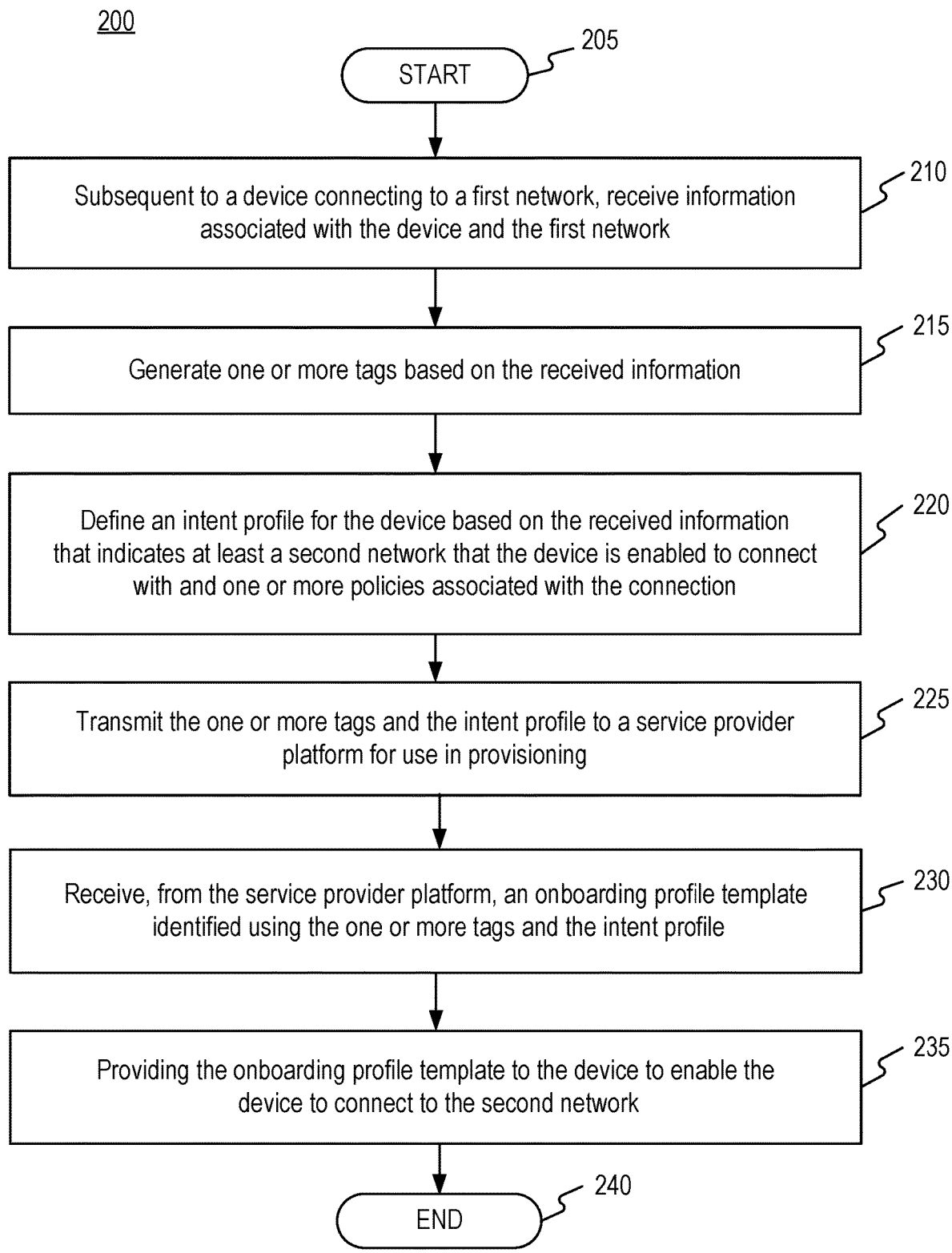
FIG. 2 is a flow chart of a method for automatically onboarding a device onto a cellular network through a Wireless Local Area Network (WLAN)

FIG. 2 is a flow chart setting forth the general stages involved in a method 200 consistent with embodiments of the disclosure for automatically onboarding a device onto a cellular network through a WLAN network. Method 200 may be implemented using computing device 600 (e.g., network management system 130) as described in more detail below with respect to FIG. 6. Ways to implement the stages of method 200 will be described in greater detail below.

Method 200 may begin at starting block 205 and proceed to stage 210 where subsequent to a device (e.g., from devices 125) connecting to a first network (e.g., of networks 110 deployed in enterprise domain 105), information associated with the device and the first network may be received. In some examples, the first network to which the device connects may be a WLAN, such as Wi-Fi network 110A, due to the simpler authentication mechanisms, as described in more detail with respect to FIG. 4. The information associated with the device received at stage 205 may include: an Identifier (ID) of the SIM or eSIM (referred to hereafter as an SIM/eSIM ID), an International Mobile Equipment Identity (IMEI), an International Mobile Subscriber Identity (IMSI), and one or more other SIM/e-SIM details. The information associated with the first network received at stage 205 may include contextual information regarding the device within the first network, such as a geographical location of the device and a network location of the device.

From stage 210 where the information associated with the device and the first network is received, method 200 may proceed to stage 215 where the received information is used to generate one or more tags that describe an identity and/or a context of the device. For example, at least an identity tag that describes the identity of the device, including a device type and a MNO, may be generated using the received SIM/eSIM information. Additionally, a context tag that describes a context of the device with respect to the first network may be generated using the received information associated with the first network. The context may include a country, state, city, and/or building the device is located in and a cell of the first network that covers that location.

From stage 215 where the tag(s) are generated, method 200 may proceed to stage 220 where the received information from stage 210 is further used to define an intent profile for the device. The defined intent profile may indicate at least a second network (e.g., of networks 110 deployed in enterprise domain 105) that the device is enabled to connect with and one or more policies associated with the connection. In some examples, the second network may include one of the private cellular networks, such as private 5G network 110B or private LTE network 110C.

Once the tag(s) are generated at stage 215 and the intent profile is defined at stage 220, method 200 may proceed to stage 225 where the tags and intent profile may be transmitted to a service provider platform, such as service provider platform 165, for use in provisioning. As discussed in greater detail below with respect to FIG. 3, the service provider platform may use the tags and intent profile to facilitate SIM/eSIM provisioning for the device.

In response to providing the tags and intent profile to the service provider platform at stage 225, method 200 may proceed to stage 230 where an onboarding profile template identified using the tag(s) and intent profile may be received from the service provider platform. The onboarding profile template may include an address to a subscription manager, such as subscription manager 170, as well as an activation token that will enable the device to request a download of an appropriate profile to the device's SIM or eSIM from the subscription manager, where the download of the profile enables the device to connect to the second network. In some examples, the address to subscription manager 170 and activation token may be accessed through mobile cloud portal 150.

Once the onboarding profile template is received at stage 230, method 200 may proceed to stage 235, where the onboarding profile template is provided to the device to enable the device to connect to the second network.

Method 200 may then end at stage 240.

Figure 3:
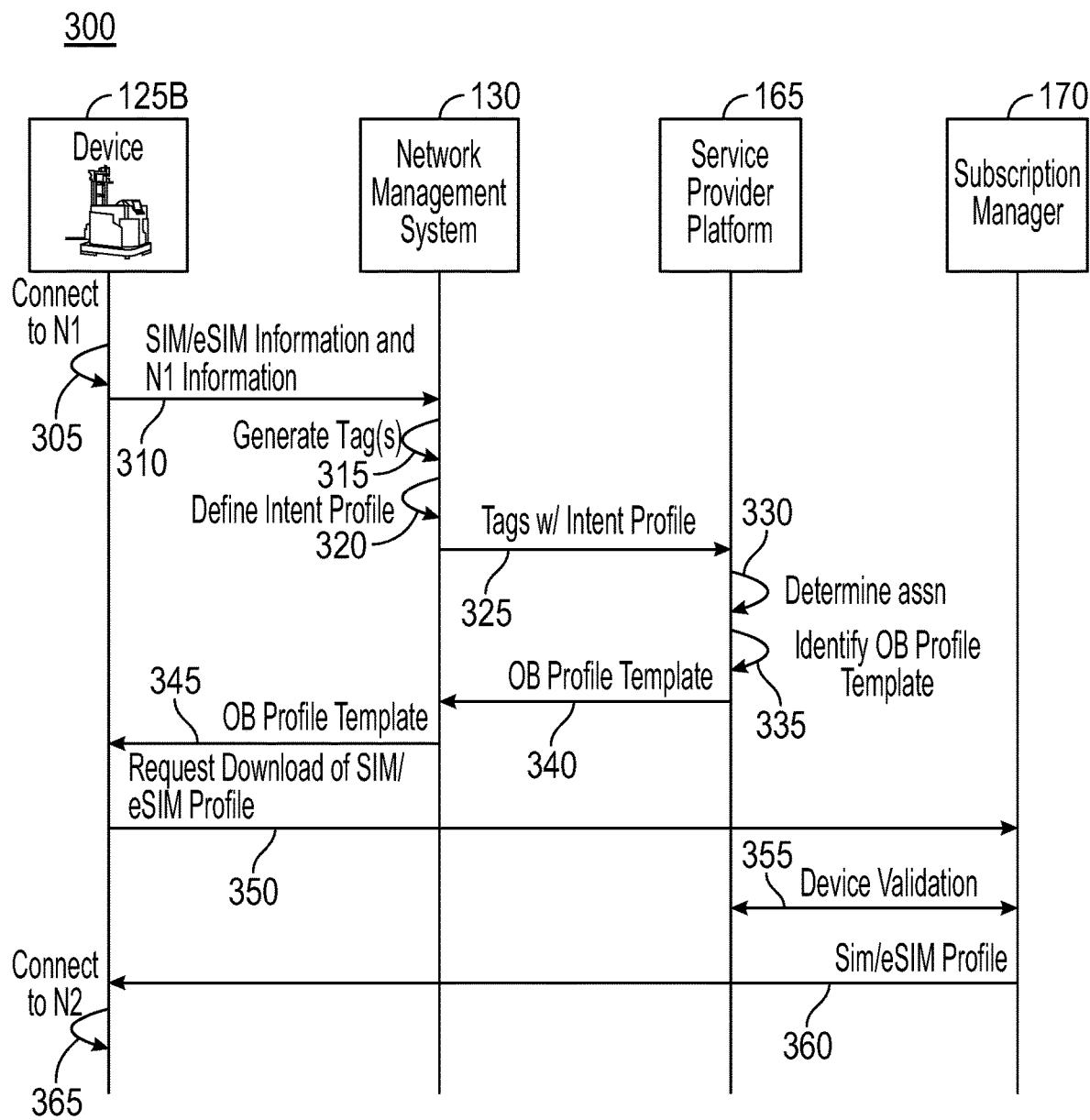
FIG. 3 is a system flow diagram illustrating the onboarding method described in FIG. 2.

FIG. 3 is a system flow diagram 300 illustrating automatic onboarding as described in FIG. 2. In this example, device 125B (e.g., AGV) located in the industrial manufacturing plant is being onboarded onto a private cellular network deployed by enterprise domain 105, such as private 5G network 110B, through a WLAN network deployed by enterprise domain 105, such as Wi-Fi network 110A. Device 125B is capable of supporting both Wi-Fi and 5G. For example, device 125B may have an embedded Wi-Fi radio as well as a SIM or an eSIM. Initially, the SIM or eSIM of device 125B may have a blank profile. Resultantly, device 125B does not know whether it can connect to public, private, or both public and private cellular networks deployed in enterprise domain 105.

At stage 305, device 125B may connect to a first network of networks 110 deployed by enterprise domain 105, where the first network may be Wi-Fi network 110A. To connect to Wi-Fi network 110A, device 125B may associate with one of Wi-Fi APs 120A (e.g., the embedded Wi-Fi radio of device 125B may establish a link with a radio of one of Wi-Fi APs 120A), hereinafter referred to as associated Wi-Fi AP 120A. Additionally, as part of the association process, device 125B may be authenticated via an IEEE 802.1X based authentication, where a local AAA server may be utilized to determine validity of provided access credentials and accordingly grants or denies a device access to the Wi-Fi network 110A. In some examples, functions of the local AAA server may be performed by security policy management system 135 and/or the local AA server may be otherwise communicatively coupled to network management system 130 such that network management system 130 may facilitate the authentication. The credentials may include a username and password, a digital certificate, or a digital key, among other example credentials.

Further, during the association process with associated Wi-Fi AP 120A, device 125B may utilize executable code to enable the reading and recording of SIM/eSIM information of the device 125B. As previously discussed, the SIM/eSIM information may include an SIM/eSIM ID, an IMEI, an IMSI, and one or more other SIM/e-SIM details. Upon successful association, the SIM/eSIM information may be provided to network management system 130 at stage 310. In some examples, the SIM/eSIM information may be provided to WLAN controller 115A via associated Wi-Fi AP 120A, and then forwarded from WLAN controller 115A to network management system 130. Additionally, network management system 130 may receive information associated with Wi-Fi network 110A from which contextual information regarding device 125B within Wi-Fi network 110A can be learned. For example, a location of device 125B, including a cell of Wi-Fi network 110A where the device 125B is located.

At stage 315, network management system 130 may generate one or more tags unique to device 125B using the information received via stage 310. As one example, network management system 130 may generate at least a first tag (e.g., an identity tag) that identifies device 125B based on the SIM/eSIM information. For example, the identity tag for device 125B may indicate that the device is a particular model of AGV and is capable of supporting both the enterprise-managed Wi-Fi and 5G provided by an MNO. Additionally, network management system 130 may generate a second tag (e.g., a context tag) that further describes where device 125B is located geographically and with respect to Wi-Fi network 110A based on the contextual information learned from the first network. For example, a context tag for device 125B may indicate that device 125B is located on a first floor in the industrial manufacturing plant located in San Jose, California, where a particular cell of Wi-Fi network 110A provides Wi-Fi coverage to device 125B. Therefore, the tags not only provide identifying features of device 125B (e.g., a type of device and a MNO), but also a country, state, city, and/or building device 125B is located in and a cell of Wi-Fi network 110A that covers that location. As described in more detail with respect to stage 335, this additional information is useful for identifying an appropriate profile for device 125B for SIM/eSIM provisioning.

At stage 320, network management system 130 may further utilize the information associated with Wi-Fi network 110A received at stage 310 to define an intent profile that indicates at least a second network to which device 125B is enabled to connect and any rules or policies associated with the connection (e.g., to enable linking of a network intent to the SIM or eSIM of device 125B in accordance with network polices). The second network can be a private cellular network of networks 110 deployed by enterprise domain 105, such as private 5G network 110B or private LTE network 110C, or a public cellular network. In some examples, device 125B may be allowed to connect with more than one cellular network. As one example, an intent profile for device 125B may indicate that in addition to Wi-Fi network 110A, device 125B is enabled to connect with a private 5G network, such as private 5G network 110B, when located in the industrial manufacturing plant. Further, because device 125B is a mobile device, the intent profile may indicate that device 125B can also roam and connect to a public 5G network when device 125B is located outside of the industrial manufacturing plant.

At stage 325, network management system 130 may transmit the tags with the intent profile to service provider platform 165. The service provider platform 165 may use the tags and intent profile to perform stages 330 and 335. For example, at stage 330, service provider platform 165 may determine an association between device 125B and one or more cellular networks. As one example, service provider platform 165, based on the intent profile, determines whether device 125B can only connect to private 5G network 110B or whether the device 125B may also be enabled to roam to a public 5G network.

At stage 335, service provider platform 165 may identify an onboarding profile template for device 125B. Service provider platform 165 may maintain a plurality of onboarding profile templates for different locations of the enterprise and for multiple different operators (e.g., MNOs). Each onboarding template profile may include an address for a subscription manager associated with a respective MNO, such as Subscription Manager 170, and an activation token. Service provider platform 165 may identify the onboarding profile template for device 125B from the plurality of onboarding profile templates based on the determined associations and information from the tags.

For example, if device 125B is only associated with private 5G network 110B, service provider platform 165 may query local UDR 140 of enterprise domain 105 to retrieve a profile for the particular SIM or eSIM of device 125B for private 5G network 110B. Service provider platform 165 may then identify an onboarding profile template corresponding to the retrieved profile as the onboarding profile template for device 125B. If device 125B is additionally or alternatively associated with a public cellular network (e.g., a public 5G network), service provider platform 165 may query an operator UDR of the MNO providing the public cellular network to retrieve a profile for the particular SIM or eSIM of device 125B for the public cellular network. Service provider platform 165 may then identify an onboarding profile template corresponding to the retrieved profile as the onboarding profile template for device 125B.

At stage 340, service provider platform 165 transmits the onboarding template profile to network management system 130. Network management system 130 then pushes the onboarding template profile to device 125B at stage 345. In some examples, the onboarding template profile is pushed in an authorization response (e.g., a response indicating that device 125B was successfully authenticated to Wi-Fi network 110A).

At stage 350, device 125B utilizes information within the onboarding template profile (e.g., the address and activation token) to request download of a profile for the SIM or eSIM of device 125B (e.g., a Sim/eSIM profile) from subscription manager 170. For example, device 125B may send the request to the address associated with Subscription Manager 170 over Wi-Fi network 110A, where the request includes the activation token.

At stage 355, subscription manager 170 communicates with service provider platform 165 to validate device 125B. Once validated, subscription manager 170 may send the SIM/eSIM profile to device 125B over Wi-Fi network 110A at stage 360. Device 125B may then program the received SIM/eSIM profile to its SIM or eSIM to enable device 125B to connect to at least the second network at stage 365.

The method and system flows for automatic onboarding described in FIG. 2 and FIG. 3 may be dependent on a connectivity between network management system 130 and service provider platform 165. However, connectivity may not always be available. In fact, enterprises utilizing these methods and systems, such as the industrial manufacturing plant described above, are often remotely located increasing opportunities for connectivity disruptions. Additionally, these method and system flows are particularly directed to onboarding devices, such as devices 125, that have a SIM or eSIM for provisioning. In some instances, devices may not include a SIM or an eSIM or SIM management may pose too high of an overhead than is practical for the enterprise to manage. To account for these scenarios, an alternative method and system flow for automatic onboarding is introduced below with respect to FIG. 4 and FIG. 5.

Figure 4:
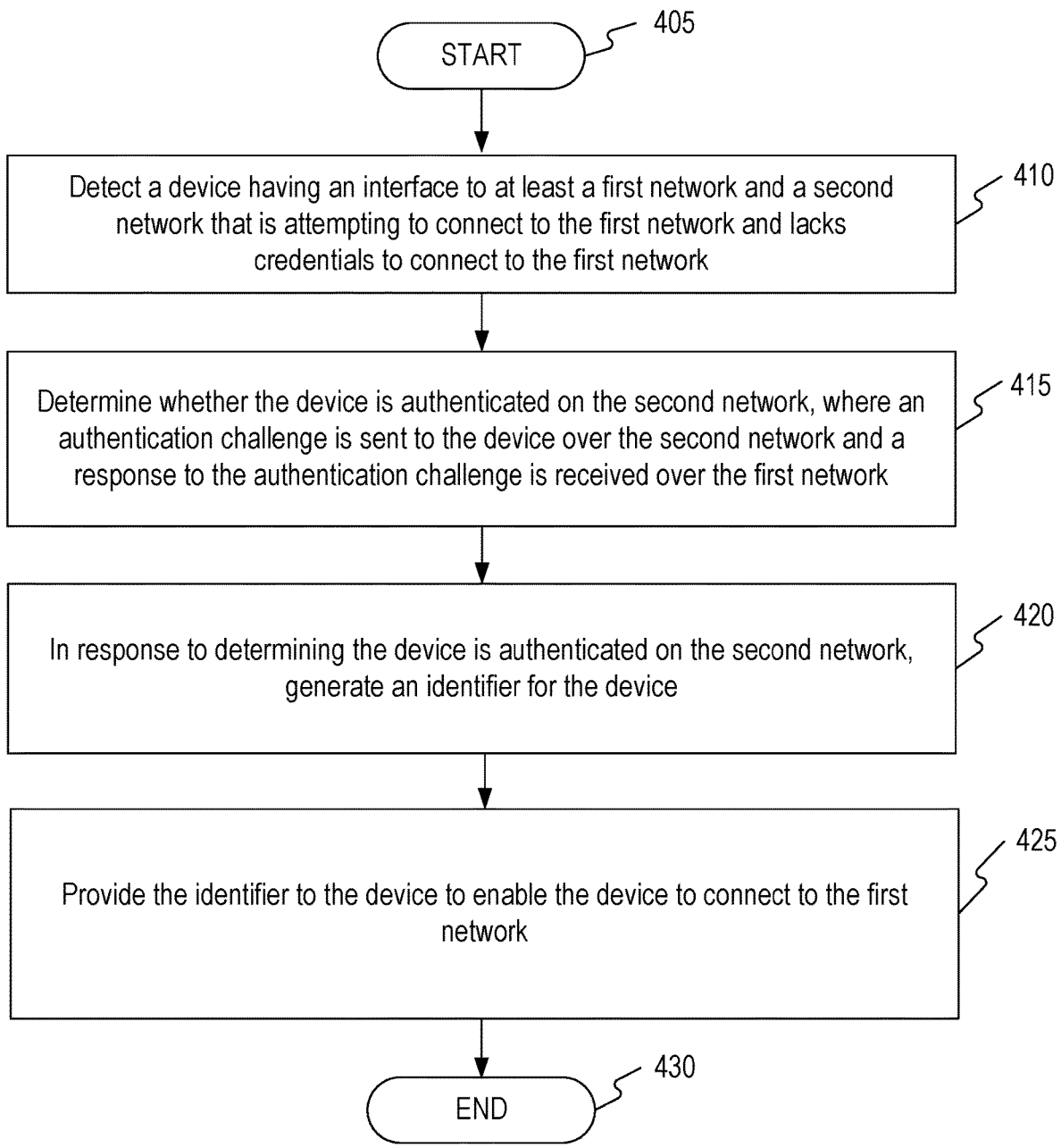
FIG. 4 is a flow chart of another method for automatically onboarding a device onto a cellular network through a WLAN.

FIG. 4 is a flow chart setting forth the general stages involved in a method 400 consistent with embodiments of the disclosure for automatically onboarding a device onto a cellular network through a WLAN network. Method 400 may be implemented using computing device 600 (e.g., network management system 130) as described in more detail below with respect to FIG. 6. Ways to implement the stages of method 400 will be described in greater detail below.

Method 400 may begin at starting block 405 and proceed to stage 410 where a detection is made that a device, such as one of devices 125, having an interface to at least a first network and a second network (e.g., of networks 110 deployed in enterprise domain 105) is attempting to connect to the first network and lacks credentials to connect to the first network. In this example, the first network may be the cellular network, such as private 5G network 110B, and the second network may be the WLAN, such as Wi-Fi network 110A.

Once the device's attempt to connect to the first network is detected in stage 410, method 400 may continue to stage 415 where a determination is made whether the device is authenticated on the second network. For example, an authentication challenge may be sent to the device over the second network, and a response to the authentication challenge may be received over the first network. The response received over the first network may be compared to the authentication challenge sent over the second network to verify the response. If verification is successful, the device may be determined to be authenticated on the second network.

In response to a determination that the device is authenticated on the second network, method 400 may proceed to stage 420 where an identifier may generated for device. The generator may include a token that provides full or selective access to the first network, as described in more detail with respect to FIG. 5.

Once the identifier is generated for the device in stage 420, the identifier may be provided to the device to enable the device to connect to the first network.

Method 400 may then end at stage 430.

Figure 5:
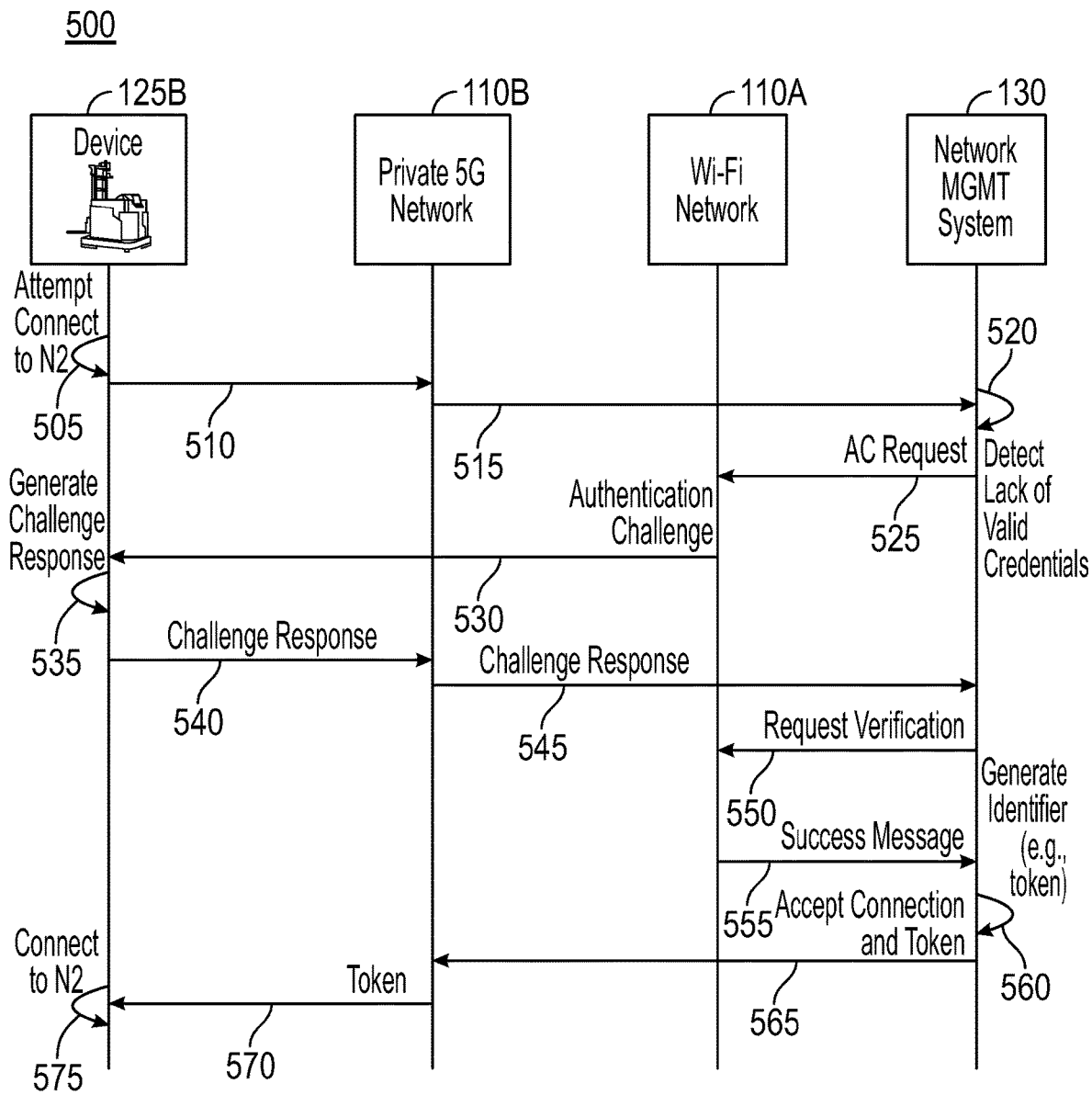
FIG. 5 is a system flow diagram illustrating the onboarding method described in FIG. 4.

FIG. 5 is a system flow diagram 500 illustrating automatic onboarding as described in FIG. 4. In this example, device 125B (e.g., AGV) from devices 125 is being automatically onboarded to a first network of networks 110 deployed by enterprise domain 105, such as private 5G network 110B, by leveraging authentication of the device 125B to a second network of networks 110 deployed by enterprise domain 105, such as Wi-Fi network 110A. Each of Wi-Fi Network 110A and private 5G network 110B illustrated in FIG. 5 may include the respective infrastructure (e.g., respective controllers 115 and APs 120) described with respect to FIG. 1.

Device 125B is capable of supporting both Wi-Fi and 5G (e.g., has interfaces to both Wi-Fi network 110A and private 5G network 110B). Network management system 130 may facilitate the authentication and onboarding processes of device 125B to both Wi-Fi network 110A and private 5G network 110B. Accordingly and as shown herein, network management system 130 may facilitating communications between Wi-Fi network 110A and private 5G network 110B. However, in other examples, WLAN controller 115A of Wi-Fi network 110A may directly communicate with core network of controller 115B of private 5G network 110B.

Prior to stage 505, device 125B may connect to Wi-Fi network 110A. Connection of device 125B to Wi-Fi network 110A may include similar association and authentication processes described with respect to FIG. 3. Additionally, similar identifying information associated with device 125B and contextual information regarding device 125B with respect to Wi-Fi network 110A may be received by network management system 130. In some examples, the identifying information may include the SIM/eSIM information of the device 125B, such as SIM/eSIM ID, an IMEI, an IMSI, and one or more other SIM/e-SIM details. In other examples, where SIM management of a private cellular network, such as private 5G network 110B, results in too much overhead than is practical for the enterprise, the identifying information received may instead include details associated with supported radio frequencies and IMEI, for example. One or more information elements may be implemented to prompt device 125B to provide these details regarding supported radio frequencies and IMEI when associating to Wi-Fi network 110A. Network management system 130 may use this information to uniquely identify device 125B, and this unique identification may be used as part of generating an identifier (e.g., a token for device 125B) described in later stages.

In some examples, network management system 130 may determine to utilize the following onboarding mechanism (e.g., rather than the onboarding mechanism described with respect to FIGS. 2 and 3) in response to determining a connectivity disruption prevents network management system 130 from communicating with (e.g., transmitting information to and receiving information from) service provider platform 165 and/or that the received information associated with the device and the network does not include SIM/eSIM information for device 125B (e.g., because device 125B does not have an SIM or eSIM), among other examples.

Once connected to Wi-Fi network 110A, at stage 505, device 125B attempts to connect to private 5G network 110B. As part of the attempt, device 125B provides credentials (or a lack thereof) to private 5G network 110B at stage 510, which may be forwarded to network management system 130 at stage 515. At stage 520, network management system 130 may determine device 125B is a new device that is not known to private 5G network 110B (e.g., because device 125B lacks valid credentials). However, given an established trust between Wi-Fi network 110A and private 5G network 110B, a determination of whether device 125B is authenticated on Wi-Fi network 110A may be made, and upon a positive authentication determination, device 125B may be granted access to private 5G network 110B by performing the following stages.

To determine whether device 125B is authenticated on Wi-Fi network 110A, at stage 525, network management system 130 may transmit to Wi-Fi network 110A (e.g., to WLAN controller 115A), a request for an authentication challenge to be sent over Wi-Fi network 110A to device 125B. In response to receiving the request, at stage 530, the authentication challenge may be sent to device 125B over Wi-Fi network 110A. For example, WLAN controller 115A may send the authentication challenge to one of Wi-Fi APs 120A to which device 125B is associated with to provide the authentication challenge to device 125B. In some examples, the authentication challenge may be a nonce forwarded over a secured action frame. In other examples, the authentication challenge may be in the form of an authentication token (e.g., an oAuth token).

At stage 535, device 125B generates a response to the authentication challenge (e.g., a challenge response) and transmits the challenge response over a 5G radio of device 125B at stage 540. When the authentication challenge is a nonce forwarded over a secured action frame, for example, the response may include the nonce encrypted with a key (e.g., a Pairwise Transient Key (PTK)) of Wi-Fi network 110A.

Based on the transmission of the challenge response 545 over the 5G radio of device 125B, private 5G network 110B may receive the challenge response (e.g., via a gNB serving as an AP 120B for private 5G network 110B). A core network of controller 115B may receive the challenge response from the gNB and forward the challenge response to network management system 130 at stage 545.

Upon receipt of the challenge response at network management system 130, network management system 130 may request Wi-Fi network 110A to verify the challenge response received at private 5G network 110B with the authentication challenge originated and sent by Wi-Fi network 110A at stage 550. Verification of this challenge response validates a presence of device 125B both on Wi-Fi network 110A as a valid, authenticated client and on private 5G network 110B.

If Wi-Fi network 110A verifies the challenge response, at stage 555, Wi-Fi network 110A may return a success message to network management system 130 that indicates device 125B is also authenticated to access private 5G network 110B. At stage 560, in response to receiving the success message, network management system 130 may generate an identifier for device 125B to enable device 125B to access private 5G network 110B. The identifier may be generated using the above-discussed identifying information associated with device 125B received as part of association and authentication of device 125B with Wi-Fi network 110A (e.g., prior to device 125B attempting to connect to private 5G network 110B at stage 505). The identifier may also be tied to one or more policies, including what device 125B is enabled to access (e.g., which network slices of private 5G network 110B), when device 125B is enabled to access, and how long or under what circumstances the identifier is valid. These policies may be applied by mobile cloud portal 150 and/or security policy management system 135.

As one example, the identifier generated at stage 560 may be a token. In some examples, the token may be permanent. In other examples, the token may be time-bound. A time period to which the token is bound may be the time period after which device 125B has to re-authenticate with Wi-Fi network 110A. Once the time period expires, the token may be invalidated or revoked. Upon re-authentication of device 125B with Wi-Fi network 110A, this onboarding process may be repeated and a new token generated, Additionally, the token may be invalidated or revoked if there is a change in the one or more policies tied to the token or there is a change in authentication to Wi-Fi network 110A. As one example, Wi-Fi network 110A may implement certificate-based authentication. Once a current certificate expires and thus authentication to Wi-Fi network 110A expires, the token is invalidated and device 125B access to private 5G network 110B is revoked. As another example, if a person is authenticating on Wi-Fi network 110A with a credential (e.g., a user name and password) and the person leaves organization, then authentication on Wi-Fi network 110A using the credentials will fail, and the token will be invalidated to prevent the person from gaining access to private 5G network 110B using the credentials.

At stage 565, an indication to accept the attempted connection of device 125B to private 5G network 110B is provided, along with the token, to private 5G network 110B. At stage 570, private 5G network may forward the token to device 125B for installation at device 125B to enable connection of device 125B to private 5G network 110B. At stage 575, device 125B may connect to private 5G network 110B using the token. Device 125B may continue to be able to access private 5G network 110B until the token is no longer valid or is otherwise revoked.

The embodiment described in FIG. 4 and FIG. 5 may be a faster, less processing intensive method for onboarding devices 125 onto private cellular networks, such as private 5G network 110B or private LTE network 110C, using a WLAN, such as Wi-Fi network 110A, deployed by enterprise domain 105. For example, by removing SIM or eSIM provisioning, overhead processing related to SIM management may be removed. Additionally, because information transmission and computational operations remain within enterprise domain 105, less transmission time is needed, which reduces an overall time it takes to onboard devices 125. Further, by linking policies to the token and enabling time limitations on token validity and/or revocability of the token, security of enterprise domain 105 may be enhanced.

Figure 6:
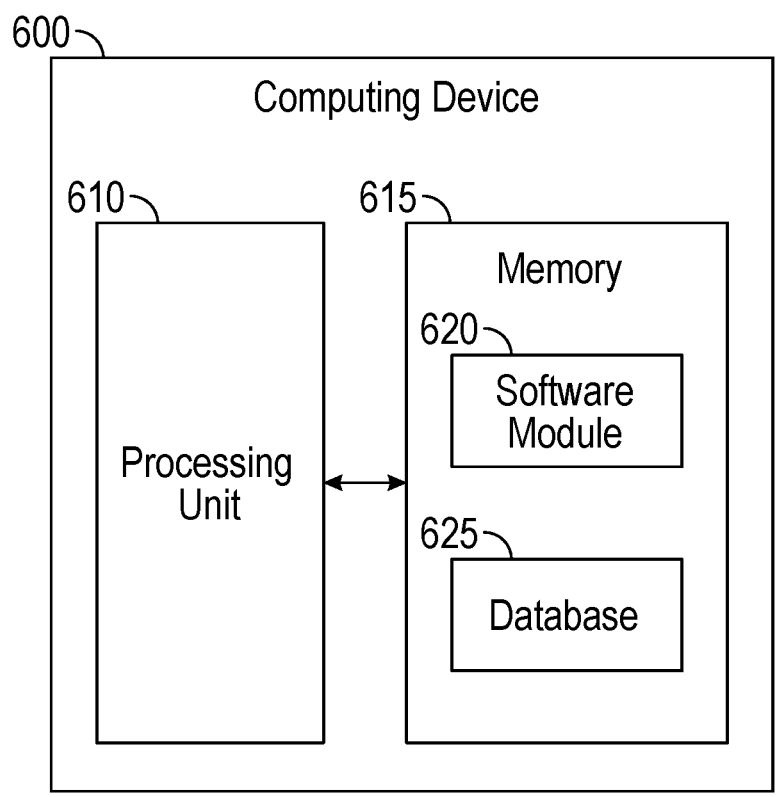
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for automatically onboarding a device to a private cellular network through a WLAN network using a defined intent profile for the device as described above with respect to FIG. 2 and FIG. 3, and processes for authenticating the device to the WLAN to provide the device access to the private cellular network (e.g., a form of zero-trust) as described above with respect to FIG. 4 and FIG. 5. Computing device 600, for example, may provide an operating environment for controllers 115, APs 120, network management system 130, security policy management system 135, mobile cloud portal 150, service provider platform 165, or subscription manager 170. Controllers 115, APs 120, network management system 130, security policy management system 135, mobile cloud portal 150, service provider platform 165, and subscription manager 170 may operate in other environments and are not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with respect to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    detecting a device having an interface to at least a first network and a second network that is attempting to connect to the first network and lacks credentials to connect to the first network;
    determining whether the device is authenticated on the second network, wherein determining that the device is authenticated on the second network comprises:
        transmitting an authentication challenge to the device over the second network,
        receiving a response to the authentication challenge from the device over the first network,
        requesting the second network to verify the response with the authentication challenge, and
        receiving a success message indicating that the device is authenticated to access the first network;
    in response to determining the device is authenticated on the second network based on the response to the authentication challenge, generating an identifier for the device; and
    providing the identifier to the device for installation to enable the device to connect to the first network.

2. The method of claim 1, wherein the first network is a cellular network, the second network is a Wireless Local Area Network (WLAN), and a first authentication mechanism of the first network is a more complex authentication mechanism than a second authentication mechanism of the second network.

3. The method of claim 1, wherein the identifier is a token, and generating the identifier comprises using one or more policies to define access to the first network via the token.

4. The method of claim 3, wherein the access to the first network includes access to one or more network slices of the first network.

5. The method of claim 3, wherein a validity of the token is at least one of revocable and limited to a time period.

6. The method of claim 1, wherein the authentication challenge comprises a nonce forwarded over a secured action frame.

7. The method of claim 6, wherein the response comprises the nonce encrypted with a key of the second network.

8. The method of claim 6, wherein the key comprises a Pairwise Transient Key (PTK) of the second network.

9. The method of claim 1, wherein the authentication challenge comprises an authentication token.

10. A system comprising:
a memory storage; and
a processing unit coupled to the memory storage, wherein the processing unit is operative to:
  detect a device having an interface to at least a first network and a second network that is attempting to connect to the first network and lacks credentials to connect to the first network;
  determine whether the device is authenticated on the second network, wherein the processing unit being operative to determine that the device is authenticated on the second network comprises the processing unit being operative to:
    transmit an authentication challenge to the device over the second network,
    receive a response to the authentication challenge from the device over the first network,
    request the second network to verify the response with the authentication challenge, and
    receive a success message indicating that the device is authenticated to access the first network;
  in response to determining the device is authenticated on the second network based on the response to the authentication challenge, generate an identifier for the device; and
  provide the identifier to the device for installation to enable the device to connect to the first network.

11. The system of claim 10, wherein the first network is a cellular network, the second network is a Wireless Local Area Network (WLAN), and a first authentication mechanism of the first network is a more complex authentication mechanism than a second authentication mechanism of the second network.

12. The system of claim 10, wherein the identifier is a token, and the processing unit being operative to generate the identifier comprises the processing unit being operative to use one or more policies to define access to the first network via the token.

13. The system of claim 12, wherein the access to the first network includes access to one or more network slices of the first network.

14. The system of claim 12, wherein a validity of the token is at least one of revocable and limited to a time period.

15. The system of claim 10, wherein the authentication challenge comprises a nonce forwarded over a secured action frame, and wherein the response comprises the nonce encrypted with a key of the second network.

16. A non-transitory computer-readable medium that stores a set of instructions which when executed perform a method, the method executed by the set of instructions comprising:
  detecting a device having an interface to at least a first network and a second network that is attempting to connect to the first network and lacks credentials to connect to the first network;
  determining whether the device is authenticated on the second network, wherein determining that the device is authenticated on the second network comprises:
    transmitting an authentication challenge to the device over the second network,
    receiving a response to the authentication challenge from the device over the first network,
    requesting the second network to verify the response with the authentication challenge, and
    receiving a success message indicating that the device is authenticated to access the first network;
  in response to determining the device is authenticated on the second network based on the response to the authentication challenge, generating an identifier for the device; and
  providing the identifier to the device for installation to enable the device to connect to the first network.

17. The non-transitory computer-readable medium of claim 16, wherein the first network is a cellular network, the second network is a Wireless Local Area Network (WLAN), and a first authentication mechanism of the first network is a more complex authentication mechanism than a second authentication mechanism of the second network.

18. The non-transitory computer-readable medium of claim 16, wherein the identifier is a token, and generating the identifier comprises using one or more policies to define access to the first network via the token.

19. The non-transitory computer-readable medium of claim 18, wherein the access to the first network includes access to one or more network slices of the first network.

20. The non-transitory computer-readable medium of claim 18, wherein a validity of the token is at least one of revocable and limited to a time period.

* * * * *